United States Patent [19]

Klima

[11] 4,102,419
[45] Jul. 25, 1978

[54] ROLLING CUTTER DRILL BIT WITH ANNULAR SEAL RINGS

[76] Inventor: Frank J. Klima, 1401 W. Chestnut St., Virginia, Minn. 55792

[21] Appl. No.: 785,089

[22] Filed: Apr. 6, 1977

Related U.S. Application Data

[63] Continuation-in-part of Ser. No. 684,669, May 10, 1976, abandoned.

[51] Int. Cl.² .................... E21C 13/00; E21B 9/10
[52] U.S. Cl. .................................. 175/371; 277/221; 308/8.2
[58] Field of Search ............. 175/371, 228, 229, 372; 277/236, DIG. 7, 214, 221, 222; 308/8.2

[56] References Cited

U.S. PATENT DOCUMENTS

| 1,353,082 | 9/1920 | Stehle et al. | 277/221 |
| 1,391,795 | 9/1921 | Safford | 277/221 |
| 1,527,307 | 2/1925 | Kamzlick | 277/222 |
| 2,485,862 | 10/1949 | Caza | 277/221 |
| 3,244,459 | 4/1966 | Ortloff | 175/229 |
| 3,303,898 | 2/1967 | Bercaru | 175/228 |
| 3,397,928 | 8/1968 | Galle | 308/8.2 |
| 3,449,024 | 6/1969 | Lichte | 175/371 |
| 3,467,448 | 9/1969 | Galle | 175/372 |
| 3,656,764 | 4/1972 | Robinson | 175/371 |

FOREIGN PATENT DOCUMENTS

456,570 11/1936 United Kingdom ................ 175/372

*Primary Examiner*—James A. Leppink
*Attorney, Agent, or Firm*—Warren A. Sturm

[57] ABSTRACT

A rotary drill bit having a rolling cutter mounted on a journal by means of internal, anti-friction bearings is provided with a sealing ring between the journal and cutter. The journal and cutter have facing, circumferential surfaces of which one surface is provided with a groove facing the other surface. One or more annular sealing rings are spring pressed against and carried by the other surface and extend into and seal against the annular groove to seal the interior bearings from contamination. The one or more rings are forced under spring pressure into the annular groove when the cutter is mounted to the journal, the ring or rings returning under spring pressure to press against and be carried by the other circumferential surface while yet extending into and sealing against the groove. In the latter position, radially spaced confronting surfaces of the sealing ring or rings and the groove define therebetween an annular space, and the journal may be provided with a passageway for conducting air or other fluid under pressure to the annular space.

9 Claims, 5 Drawing Figures

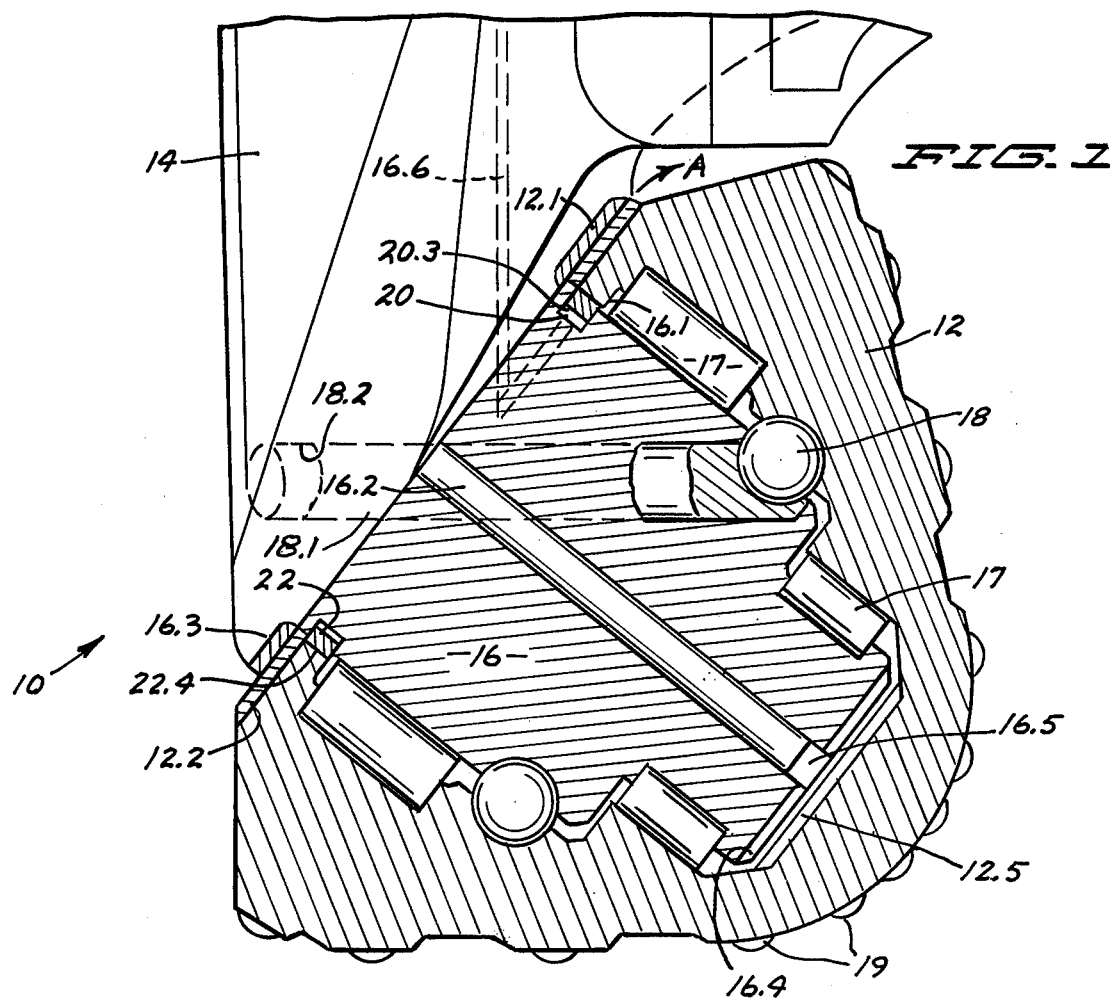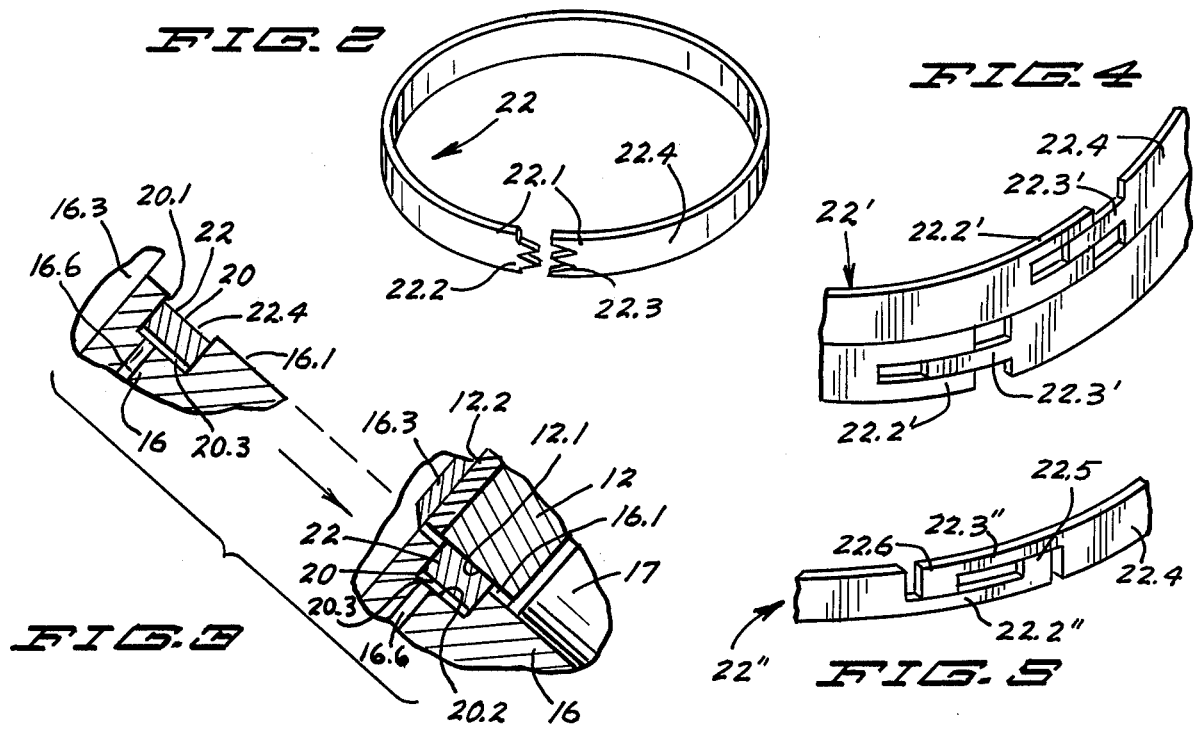

ROLLING CUTTER DRILL BIT WITH ANNULAR SEAL RINGS

This is a continuation-in-part of application Ser. No. 684,669, filed May 10, 1976 for DRILLING BIT AND METHOD now abandoned.

BACKGROUND OF THE INVENTION

Conventional rock bits which are employed for drilling wells and the like ordinarily employ two or three or more cone-shaped rolling cutters rotatably mounted on journals, the cutters having teeth or rock-crushing inserts on their conical surfaces. The cutters are so arranged as to roll, under considerable weight, upon the bottom surface of the hole being drilled as the well string to which the bit is attached is rotated. A fluid, such as air, is forced down the well string and is discharged through the bit to flush drill cuttings upwardly in the well bore. The cutters are mounted to the journals by interior, anti-friction bearings which are highly subject to wear and destruction if abrasive cuttings at the bottom of the well are allowed to penetrate between the journal and cutter and to contact the bearings or if there is a loss of lubrication from the bearings.

Various means have been employed to combat this problem. For example, compressed air may be fed to the interior of the bit to flush the anti-friction bearings of contamination. A seal may be employed at the exposed juncture of the journal and cutter to prevent migration of contamination inwardly to the bearings and to seal in lubricants. In the latter system, seals of varying materials and configurations have been employed, and exemplary of such seals are those shown in U.S. Pat. Nos. 3,096,835; 3,193,028; 3,381,968; 3,489,421; 3,397,928; 3,746,405 and 3,765,495.

It would be desirable to provide a seal between the cutter and journal of a rotary drill bit which would not only be highly effective in restraining the passage of contamination to interior anti-friction bearings, and retain lubricants such as greases or oils, but which would also lend itself to the ready assembly of the rolling cutter to the journal.

SUMMARY OF THE INVENTION

The present invention provides a rotary drill bit which can be easily assembled and which has a seal. The seal restrains the passage of contamination to interior anti-friction bearings which mount a rolling cutter to a journal of the bit, and prevents lubricants from escaping. The rolling cutter has a recessed open end for reception of the journal, and the journal and the cutter are provided with circumferential confronting surfaces adjacent the open end of the cutter. One of the surfaces has an annular groove therein facing the other surface. Sealing ring means, comprising at least one annular, spring-loaded sealing ring, is spring pressed against and is carried by the other surface and extends into and seals against the annular groove. The annular groove desirably is provided in the circumferential surface of the journal and is desirably of rectangular cross section, and the confronting surface of the rolling cutter desirably is generally cylindrical, the sealing ring being generally rectangular in cross section and sized to slidingly fit snuggly within the groove.

For assembly, the spring-loaded sealing ring is forced, against spring pressure, into the annular groove to permit the cutter to be mounted on the journal with the other circumferential surface coming into registration with the groove. The sealing ring, returning under spring pressure, presses against and is carried by the other circumferential surface while yet extending into and sealing against walls of the groove, and forming an annular space between the bottom of the groove and the confronting peripheral surface of the ring. The journal may be provided with a passageway for conducting a fluid such as air under pressure to the annular space, the fluid escaping outwardly from the latter space to flush cuttings or other debris away from the seal.

DESCRIPTION OF THE DRAWING

FIG. 1 is a broken away side view, in cross section, of a portion of a drill bit of the invention;

FIG. 2 is a perspective view of a spring loaded sealing ring employed in the invention;

FIG. 3 is an exploded diagramatic view in partial cross section and partially broken away and showing assembly of a drill bit of the invention with a sealing ring;

FIG. 4 is a broken away view of two sealing rings of modified form and used in combination with one another to form a labyrinth-type seal; and FIG. 5 is a broken away view of another sealing ring modification.

DESCRIPTION OF THE PREFERRED EMBODIMENT

Referring first to FIG. 1, a rock bit 10 may be provided with three conical rolling cutters 12, of which but one cutter is depicted in the drawing. The bit, which may be threaded onto the lower end of a well string, includes a body 14 bearing at its lower end a journal 16. The conical rolling cutter 12 has an open, recessed end for receiving the journal 16, and the cutter and journal are so oriented as to permit the conical surface of the cutter to roll generally horizontally on the bottom surface of the well holes being drilled. Internal anti-friction bearings, shown as roller bearings 17 and ball bearings 18, rotatably mount the cutter 12 to the journal 16, with the ball bearings retaining the cutter on the journal. The ball bearings may be inserted through a lateral insertion hole 18.1 in the journal which is later filled with a plug 18.2, all as is known in the art. Extremely hard cutting inserts 19, which may be of a hard metal carbide such a tungsten carbide, are provided in the conical surface of the cutter.

The cutter 12 and journal 16 are provided with closely confronting, circumferential surfaces (12.1, 16.1 in FIG. 3) which are adjacent and spaced inwardly slightly from the open end of the cutter. In one of these surfaces (the journal surface in FIGS. 1 and 3), an annular groove 20 with a generally rectangular cross section is provided. The groove includes side walls 20.1 and a flat bottom 20.2 all as shown best in FIG. 3, the groove confronting the generally cylindrical inner surface 12.1 of the cutter. For strength, the groove may have rounded internal corners as shown best in FIG. 3.

Sealing ring means, comprising one or more spring-loaded sealing rings such as ring 22 in FIG. 2, is provided, the ring or rings being desirably of generally rectangular cross section. The ring 22 is of a springy metal, such as spring steel, and is split so that it may expand or contract slightly against spring pressure. As shown in FIG. 2, the split ends 22.1 of the ring may be provided with interfitting ends. For example, the ends may have teeth 22.2, 22.3 which permit the circular continuity of the ring to be maintained as the diameter of the ring is changed; that is, the teeth at the ends of the ring will always interleave to some extent as the ring is compressed or expanded. With reference to the journal and cutter of the drawing, the diameter of the sealing ring at rest is slightly greater than the diameter of the cylindrical surface 12.1 of the cutter, and the ring is capable of being compressed into a diameter slightly less than the diameter of the surface 12.1.

If two or more sealing rings are to be used, they may have their end portions staggered circumferentially, as shown in FIG. 4, to form a labyrinth-type seal for more effectively preventing the entrance of contamination to the bearings or the escape of a lubricant therefrom. The split rings need not have interfitting ends however, when two or more rings are thus employed in a labyrinth seal.

The interfitting teeth in the ring 22' depicted in FIG. 4 are designated 22.2' and 22.3', respectively, and have a generally uniform rectangular cross section throughout their length so as to continuously interfit closely with each other as the spring is contracted and expanded. The teeth 22.2', 22.3' of the ring 22' depicted in FIG. 5 have interlocking ends 22.5, 22.6 which permit expansion and contraction of the ring but which restrain the ends of the ring from separating altogether.

The sealing ring or rings may be made of hard but springy heat resistant and gall and wear resistant metals such as stainless steel, Stellite Haynes 25 (an iron based alloy of the Stellite Division, Cabot Corporation), Hastalloy B.C., etc.

To assemble the rolling cutter 12 and journal 16, the at least one spring-loaded sealing ring 22 is forcibly compressed into the groove 20 of the journal, as shown in the upper view of FIG. 3. The journal and cutter are then assembled as in FIG. 1, with the surface 12.1 of the cutter coming into registration with the groove 20. The sealing ring 22 expands under its spring pressure to seat against the circumferential surface 12.1 of the cutter. The radial thickness of the ring is such that when the ring has expanded into contact with the cutter, the ring yet extends into the groove 20. The axial width of the ring (or rings, if two or more are employed) is approximately the same as, or slightly smaller than the distance between the side walls 20.1 of the groove so that the ring or rings fit snuggly in sealing, sliding contact between the side walls of the groove. As the ring expands under spring pressure into contact with the cutter wall 12.1, it withdraws from the interior surface of the groove to provide an annular space 20.3 between the groove bottom 20.2 and the ring. The ring hence is not radially compressed between the journal and cutter, and is not exposed to any significant radial or axial loading between the journal and cutter during use. The ring is accordingly capable of flexing radially slightly under spring pressure to maintain its sealing function as the drill bit bearings become worn by extended usage.

As shown in FIGS. 1 and 3, the journal 16 may be provided with a passageway 16.1 communicating at its upper end with the interior of the well string (not shown) and at its other end with the annular space 20.3. Air or other fluid may be forced downwardly through the well string during the drilling operation, the fluid entering the space 20.3 and escaping outwardly from the space as shown by the arrow "A" in FIG. 1 to flush drill cuttings or other contamination outwardly to thus restrain the entrance of contamination past the seal and into the bearings 17, 18.

As described in my co-pending application Ser. No. 771,520 filed Feb. 24, 1977 as a continuation-in-part of application Ser. No. 679,212 filed Apr. 22, 1976 and entitled DRILLING BIT WITH HARD-FACED BEARING SURFACES the journal and cutter of the drill bit may also be provided with hardened, mating bearing surfaces 16.3, 12.2 on confronting surfaces of the journal and cutter at the exterior of the open end of the cutter, as shown best in FIG. 1, these bearing surfaces further supporting axial loads which may be placed upon the cutter and also helping to prevent the admission of contamination to the internal anti-friction bearings and prevent rapid outflow of lubricant. Another pair of cooperating, hardened surfaces 16.4, 12.3 may be provided at the inner ends of the journal and cutter, as shown in FIG. 1, and are normally spaced apart slightly when the outer bearing surfaces 16.3, 12.2 are in contact. The central bore 16.2 of the journal may be used to supply lubricant (not shown) to the bearings. In one embodiment, the bore 16.2 is packed with lubricant and communicates at its upper end with the interior of the well string, the pressurized fluid in the well string thus urging the packed lubricant into the internal antifriction bearings 17, 18. In this manner, if desired, the flow of lubricant may be opposed and thus regulated to some extent by the opposing leakage of pressurized fluid from the annular space 16.6 past the sealing ring means 22.

As noted above, the spring-loaded sealing ring or rings 22 need be compressed only sufficiently within the groove as to permit the inner cylindrical surface 12.1 of the cutter to contact and overlie the ring or rings slightly, whereupon the cutter may be advanced slightly to its mounted position (FIG. 1) by sliding over the outer surface or surfaces 22.4 of the rings.

Thus, manifestly, I have provided a rotary drill bit having at least one annular, spring-loaded sealing ring which is easily installed during assembly of the bit, which seals the bit against the entry of contaminants and the escape of lubricant, and which facilitates assembly and disassembly of the bit.

While I have described a preferred embodiment of the present invention, it should be understood that various changes, adaptations, and modifications may be made therein without departing from the spirit of the invention and the scope of the appended claims.

What is claimed is:

1. A rotary drill bit having a journal, a rolling cutter having a recessed open end for reception of the journal, and interior anti-friction bearings rotatably mounting the cutter on the journal, the journal and the cutter having spaced, circumferential, confronting surfaces adjacent the open end of the cutter with one of the surfaces having an annular groove therein, and sealing ring means comprising annular, spring-loaded sealing ring spring means having at least a pair of axially aligned sealing rings having split ends staggered circumferentially of the journal to define a labyrinth seal pressed against and carried by the other circumferential surface and extending into and sealing against the annular groove to seal the interior anti-friction bearings from contamination by drill cuttings or the like and to restrain escape of internal lubricants.

2. The rotary drill bit of claim 1 wherein the annular groove is provided in the circumferential surface of the journal to position the sealing ring means against the confronting surface of the cutter at a position spaced inwardly slightly of the open end of the cutter.

3. The rotary drill bit of claim 1 in which the at least one sealing ring, and the groove, have spaced confronting surfaces defining therebetween an internal annular space.

4. The rotary drill bit of claim 3 in which the groove and the at least one ring are generally rectangular in cross section and wherein the at least one ring is sized to fit slidingly between confronting walls of the groove.

5. The rotary drill bit of claim 3 in which the journal includes a passageway communicating with the annular space to conduct a pressurized fluid into the annular space.

6. A rotary drill bit having a journal, a rolling cutter having a recessed open end for reception of the journal, and interior anti-friction bearings rotatably mounting the cutter on the journal, the journal and the cutter having spaced circumferential, generally cylindrical confronting surfaces adjacent but spaced from the open end of the cutter with the circumferential surface of the journal having an annular groove of substantially rectangular cross section therein which is open to and faces the circumferential surface of the cutter, and sealing ring means including at least one annular, spring-loaded metal sealing ring and having a substantially rectangular cross section sized to fit snuggly between opposed walls of the groove, the at least one ring being spring pressed against, and carried by, the circumferential surface of the cutter and extending in sealing relationship within the groove, the sealing ring means and the groove having radially spaced confronting surfaces defining therebetween an annular space and at least a further sealing ring means disposed adjacent thereto.

7. The rotary drill bit of claim 6 in which the sealing ring means has side walls adjoining its outer surface and in sliding and sealing contact with side walls of the groove.

8. The rotary drill bit of claim 6 in which the annular sealing ring is a split metal ring having ends with interfitting teeth to permit changes in the diameter of the ring without interruption of its circular continuity.

9. The rotary drill bit of claim 6 in which the journal includes a passageway communicating with the annular space to conduct a pressurized fluid into the latter space.

* * * * *